I. JOHNSON.
COUPLINGS FOR TUBING AND LIGHTNING-RODS.

No. 173,962. Patented Feb. 22, 1876.

WITNESSES:

INVENTOR:
Isaac Johnson
BY
ATTORNEYS.

UNITED STATES PATENT OFFICE

ISAAC JOHNSON, OF CHICAGO, ILLINOIS, ASSIGNOR TO REYBURN, HUNTER & CO., OF SAME PLACE.

IMPROVEMENT IN COUPLINGS FOR TUBING AND LIGHTNING-RODS.

Specification forming part of Letters Patent No. 173,962, dated February 22, 1876; application filed November 29, 1875.

*To all whom it may concern:*

Be it known that I, ISAAC JOHNSON, of Chicago, in the county of Cook and State of Illinois, have invented a new and Improved Coupling for Pipes; and I do hereby declare that the following is a full, clear, and exact description of the same, reference being had to the accompanying drawing, forming a part of this specification, in which—

Figure 1:
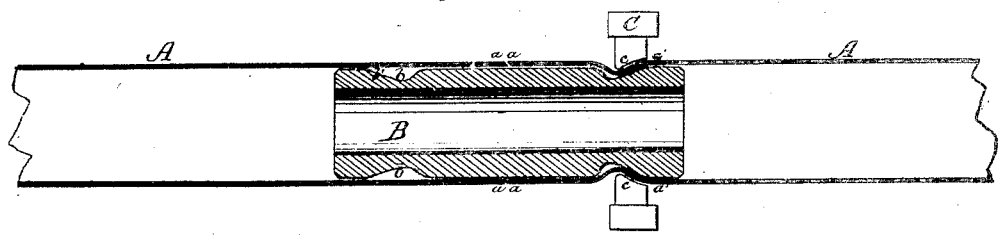
Figure 2:
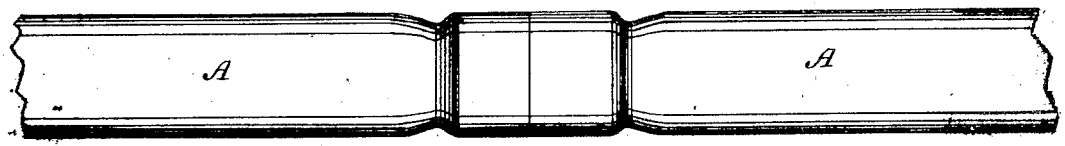
Figure 3:
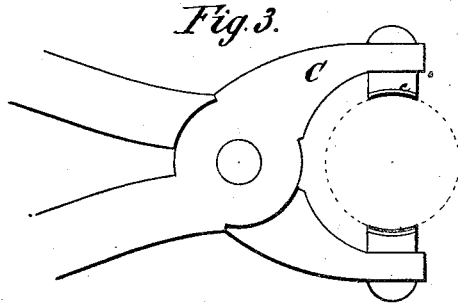

Figure 1 is an axial section of two pipes, showing the process of making the coupling; Fig. 2, a side view of two pipes shown coupled together; Fig. 3, a side view of an ordinary tool adapted for use in making the coupling-joint.

The invention relates to a novel mode of connecting sections of pipe made of lead and sheet metal; and consists in the employment of a hollow connecting-piece, annularly grooved near each end, the metal of each pipe-section being quickly pressed into the grooves, which are of such construction that while the metal is being pressed into them they serve to force the adjacent ends of the pipe-sections firmly together, as will be hereinafter explained.

A A represent two sections of sheet-metal pipe, and B my improved coupler-tube, which has an annular groove, $b$, near each end. These grooves are made in the shape of a curve or an obtuse angle, the slope being larger in the direction of each end than toward the middle. The object of this form of groove is to prevent the metal that goes into the grooves from being drawn away from the contacting ends $a\ a$, and compel the shortening of length to come from the long part $a'$ of the pipe. This is accomplished by the use of a tool, C, which has a bottom incline, $c$, that corresponds with the long slope $b'$ of groove. When the tool is pressed and turned around on the pipe, the metal is drawn forward and the pipe shortened by filling into a groove from the part $a'$ of pipe, and without pulling apart the ends $a\ a$. The pipe-section A has one of its end edges beveled on the outside, and the other correspondingly beveled on the inside, so that the latter or top edge may overlap the former or subjacent edge, thus protecting the tube from the ingress of water, and allowing the latter to pass quickly down its outer surface when the pipes are placed in perpendicular positions.

Having thus described my invention, what I claim as new is—

1. The combination, with pipe-sections A A, of intermediate short tube B, the latter having annular grooves, in which the metal of the former is circumferentially pressed, as and for the purpose described.

2. A coupling-tube, B, having the annular grooves $b$, with a longer slope toward the ends than toward the middle, as and for the purpose specified.

3. A lightning-rod section-tube having the opposite end edges correspondingly beveled on the inside and outside, as and for the purpose set forth.

ISAAC JOHNSON.

Witnesses:
SOLON C. KEMON,
CHAS. A. PETTIT.